Oct. 19, 1926.
W. B. FAGEOL
1,603,528
VEHICLE BODY CONSTRUCTION
Filed July 5, 1924
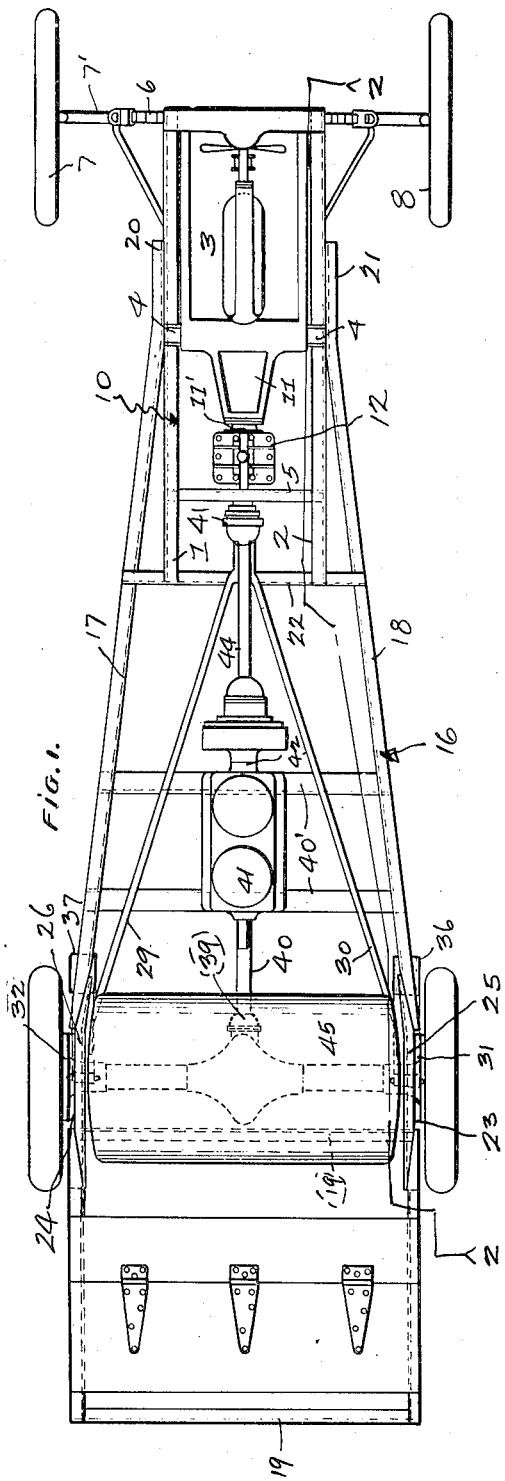
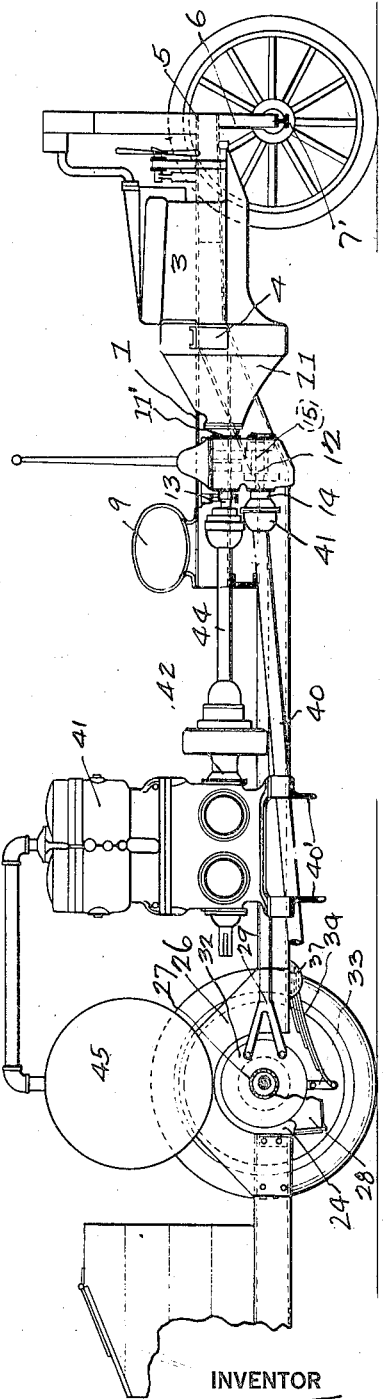
INVENTOR
William B. Fageol
BY
ATTORNEY Patented Oct. 19, 1926.

1,603,528

UNITED STATES PATENT OFFICE.

WILLIAM B. FAGEOL, OF OAKLAND, CALIFORNIA.

VEHICLE BODY CONSTRUCTION.

Application filed July 5, 1924. Serial No. 724,336.

This invention relates particularly to a vehicle construction wherein the vehicle body is of the "low-bed" type.

An object of the invention is to provide a vehicle formed of a pair of connected frames, of which one frame is below the plane of the other frame, whereby, driving and driven engines, mounted on the respective frames, will have their connected driving shafts in substantial axial alignment.

A further object of the invention is to attach a load carrying frame to a portion of the front end of the engine carrying frame of a truck to permit the rear axle housing and driving worm to be connected to the load carrying frame in a reversed position, to that which the said axle housing and driving worm normally assumes on a standard type truck, whereby the load carrying frame is placed close to the traction surface, and in addition lubrication of the underslung driving worm is simplified.

A still further object of the invention is to provide a vehicle of the character to be described that will be superior in point of simplicity, inexpensiveness of construction, positiveness of operation, and facility and convenience in use and general efficiency.

Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings,

Fig. 1 represents a plan view of a vehicle, constructed in accordance with my invention.

Fig. 2 is a longitudinal section taken through Fig. 1 on the line 2—2.

Automotive vehicles are being used more and more for conveying different mechanical units, such as portable air compressors, concrete mixers, electric generators, and the like, from job to job, it being necessary that the vehicle body should, to a certain extent, be adaptable to use for the purposes desired. Vehicles constructed for the purposes set forth, as well as vehicles provided with a "low-bed" body for freight delivery, or for vehicle towing and carrying purposes, are as a general rule makeshift in their construction and not efficiently adapted to the uses desired of the same. My invention contemplates a cheap, rigid, and well constructed frame which may be secured to a portion of the engine carrying end of a Ford truck frame, although a portion of the front end of any type of vehicle frame might be used in combination therewith, with the object of providing a vehicle body that is as near to a traction surface as running and road conditions will permit in order to be readily accessible to a person standing on the traction surface.

In detail, the construction illustrated in the drawings comprises a main frame 10, consisting of the channel members 1 and 2, and having an engine 3 fixedly mounted thereon by the connected brackets 4. The members 1 and 2 are connected together at the front and rear by the cross bars 5. The fore part of the frame 10 is connected by the resilient spring 6 to an axle 7′ the ends of which projects beyond opposite sides of the respective members 1 and 2, to permit the traction wheels 7 and 8 being rotatably mounted thereon. The wheels are mounted on the front axle in any conventional manner, and have a suitable steering mechanism (not shown) connected thereto. A suitable fuel supply tank 9 is mounted on the frame 10 to contain a source of fuel supply for running the motor 3.

The main frame 10 together with all of its running equipment consists of any type of truck from which the rear portion of the frame and other operating mechanism has been severed; and particularly the type of truck adaptable to the uses herein described would be the standard type of worm driven truck. The engine 3 is provided with a housing 11 on one end thereof in which a clutch and variable speed control device (not shown) is arranged and from which a driven shaft 11′ extends into operative connection with the driving shaft 13 of a selective gear transmission, generally designated by the numeral 12. The transmission 12 is provided with a main drive shaft 13 therein in axial alignment with the shaft 11′ extending from the motor, and a secondary drive shaft 14, said shafts 13 and 14 being connected by change speed gears 15 mounted on said shafts. The cross beam 5 serves to support the transmission 12 in the desired position on the main frame 10.

A load carrying or secondary frame, generally designated by the numeral 16 and consisting of a pair of spaced, channel members 17 and 18, connected together by lateral stiffeners 19 at predetermined intervals throughout the length thereof, has the front ends of the members 17 and 18 inclined upwardly and inwardly to permit the attachment of the same, at 20 and 21, to the outsides of the members 1 and 2 of the main frame 10. The rear ends of the members 1 and 2 rest upon a cross beam 22 which has its opposite ends resting upon the upper edge of the opposite channel members 17 and 18. All of the connected parts of the main frame 10 and secondary frame 16 are rigidly joined together to form a solid and rigid structure.

The respective frame members 17 and 18 are cut away at corresponding points 23 and 24 and the cut away portions of the members 17 and 18 are trussed together by the opposite arched gusset plates 25 and 26. The openings 23 and 24 in the secondary frame 16 form a space in which the rear axle housing 27 is confined. In the construction of my vehicle I utilize the complete rear end housing and driving mechanism of a Ford truck, turning the same over so that the worm housing 28 in the axle housing 27 is underslung and lies on the under side thereof, in contra-distinction to the standard practice of arranging the driving worm on the upper side of the axle housing. I have found that by turning over the entire rear axle structure I am enabled to secure the rear ends of the radius rods 29 and 30 to the connecting means provided on the respective rear axle brake housings 31 and 32 without the necessity of providing a different attaching means on said brake housings. In order to provide a flexible suspension of the rear axle housing 27 with respect to the secondary frame, I pivotally arrange spring shackles 33 and 33' on the rear axle brake housings 31 and 32 to each of which an end of each of the springs 34 and 34' is connected, the opposite ends of said springs being secured to the respective frame members 17 and 18 by the clamps 36 and 37.

The end of the worm shaft in the worm housing 28 is provided with a universal joint 39 thereto which is connected by a propeller shaft 40 and universal joint 41 to the secondary drive shaft 14 of the transmission 12. The construction of the transmission 12 is such that the direction of rotation of the engine drive shaft 11' is reversed when it leaves the secondary drive shaft 14 and this permits the turning over of the rear axle housing and making an underslung worm without interfering with the direction of drive of the worm and worm wheel. The worm drive being at the lowest point in the axle housing makes lubricating of the worm a simple problem, and more important, permits the lowering of the secondary frame 16 very close to the ground. The secondary frame 16 is covered in accordance with the uses desired to be made of it, and as shown in the present application is provided with cross beams 40' upon which an air compressor or other driven engine 41 is mounted. By lowering the plane of the secondary frame 16 below that of the main frame 10 it is possible to mount an auxiliary engine 41 on said secondary frame 16 so that the driven shaft 42 of said auxiliary engine 41 and the connecting shaft 44 between the drive shaft 13 and driven shaft 42 is in substantial axial alignment. A tank 45 is arranged on the secondary frame to aid in the operation of the engine 41, or any form of apparatus might be mounted on the secondary frame necessary to the functioning of the auxiliary engine which would be arranged thereon. Although I have illustrated an air compressor and air storage tank mounted on the secondary frame, it is to be understood I am not limited to that particular form of device as it would be clearly within the purview of the invention to put a concrete mixer, electric generator, delivery body, winch attachment or some other type of mechanism on the secondary frame 16 so that there would be a direct power take-off from the vehicle driving engine 3 to the driven engine 41.

Having thus described this invention, what I claim and desire to secure by Letters Patent is:—

1. A vehicle construction comprising a main frame; an axle resiliently connected to said main frame and projecting beyond opposite sides thereof; wheels rotatably mounted on the opposite ends of said axle; a secondary frame secured at its front end to the rear end of said main frame below the plane of said main frame, said frame being cut away and trussed at corresponding points on opposite sides; an axle housing registering with the cut away portions in the frame and resiliently connected to the frame; and traction wheels rotatably mounted on the opposite ends of the axle housing.

2. A vehicle construction comprising a main frame; an axle resiliently connected to said main frame and projecting beyond opposite sides thereof; wheels rotatably mounted on the opposite ends of said axle; a driving engine mounted on said main frame; a clutch and variable speed control connected to said driving engine; a secondary frame secured at its front end to the rear end of said main frame below the plane of said main frame, said frame being cut away and trussed at corresponding points on opposite sides; an axle housing registering with the cut away portions in the frame and resiliently connected to the frame; traction wheels rotatably mounted on the opposite ends of the axle housing; driving means in said axle housing to rotate said traction wheels; and a propeller shaft connecting said driving means to said variable speed control.

3. A vehicle construction comprising a main frame; an axle resiliently connected to said main frame and projecting beyond opposite sides thereof; wheels rotatably mounted on the opposite ends of said axle; a clutch on said engine; a change speed transmission, connected to said clutch, having a pair of drive shafts projecting therefrom; a secondary frame secured at its front end to the rear end of said main frame below the plane of said main frame, said frame being cut away and trussed at corresponding points on opposite sides; a driven engine mounted on said secondary frame having a drive shaft extending therefrom; a propeller shaft connecting said driven engine shaft and one of said transmission shafts; an axle housing registering with the cut away portions in the frame and resiliently connected to the frame; traction wheels rotatably mounted on the opposite ends of the axle housing; driving means in said axle housing to rotate said traction wheels; and a propeller shaft connecting said driving means and said other transmission shaft.

4. A vehicle construction comprising a main frame; an axle resiliently connected to said main frame and projecting beyond opposite sides thereof; wheels rotatably mounted on the opposite ends of said axle; a clutch on said engine; a change speed transmission, connected to said clutch, having a pair of drive shafts projecting therefrom; a secondary frame secured at its front end to the rear end of said main frame below the plane of said main frame, said frame being cut away and trussed at corresponding points on opposite sides; a driven engine mounted on said secondary frame having a drive shaft extending therefrom in substantial axial alinement with one of the transmission shafts; a propeller shaft connecting said driven engine shaft and one of said transmission shafts; an axle housing registering with the cut away portions in the frame and resiliently connected to the frame; traction wheels rotatably mounted on the opposite ends of the axle housing; driving means in said axle housing to rotate said traction wheels; and a propeller shaft connecting said driving means and said other transmission shaft.

In testimony whereof, I have hereunto set my hand at San Francisco, California, this 25th day of June, 1924.

WILLIAM B. FAGEOL.